United States Patent [19]

Papp

[11] 4,026,165
[45] May 31, 1977

[54] DUAL BRAKE ACTUATING HANDLE BARS AND BICYCLE NECK ASSEMBLY

[76] Inventor: Joseph Papp, 7012 Arbutus, Huntington Park, Calif. 90255

[22] Filed: Jan. 12, 1976

[21] Appl. No.: 648,197

[52] U.S. Cl. .............................. 74/480 R; 74/489; 74/506; 74/551.1; 280/264
[51] Int. Cl.² .................... B62K 21/12; B62L 3/00; G05G 11/00
[58] Field of Search ............. 74/551.1, 551.8, 480, 74/489, 506; 280/88, 263, 264; 188/24

[56] References Cited

UNITED STATES PATENTS

| 575,936 | 1/1897 | Roso | 188/24 |
| 702,337 | 6/1902 | Bennett | 188/24 |

FOREIGN PATENTS OR APPLICATIONS

| 325,192 | 9/1902 | France | 74/551.1 |
| 371,517 | 11/1906 | France | 74/551.1 |
| 794,122 | 8/1935 | France | 74/551.8 |
| 907,527 | 10/1944 | France | 188/24 |
| 93,242 | 9/1895 | Germany | 188/24 |
| 12,305 | 1896 | United Kingdom | 74/551.1 |

*Primary Examiner*—Carlton R. Croyle
*Assistant Examiner*—Leonard Smith
*Attorney, Agent, or Firm*—Dominick Nardelli

[57] ABSTRACT

A novel bicycle neck has two sleeves disposed one over the other. A round handle-bar is rotatably mounted in each sleeve. The novel neck is placed into the front wheel fork of the bicycle after the standard prior art gooseneck has been removed. A flexible cable is attached by one end to the handle-bar in the upper sleeve so that the cable could be wound thereon by turning the handle-bar. The cable is then wound around the lower handle-bar and attached thereto to prevent slippage therebetween. The cable terminates at a whiffletree. Also attached to the whiffletree are two more cables disposed on opposite sides of the cable depending from the handle-bars. One of these other cables actuates the front wheel brakes, and the other actuates the rear wheel brakes when the cables are in tension. Tension is placed on the cables by rotating any one of the handle-bars within its respective sleeve.

6 Claims, 2 Drawing Figures

U.S. Patent  May 31, 1977  4,026,165
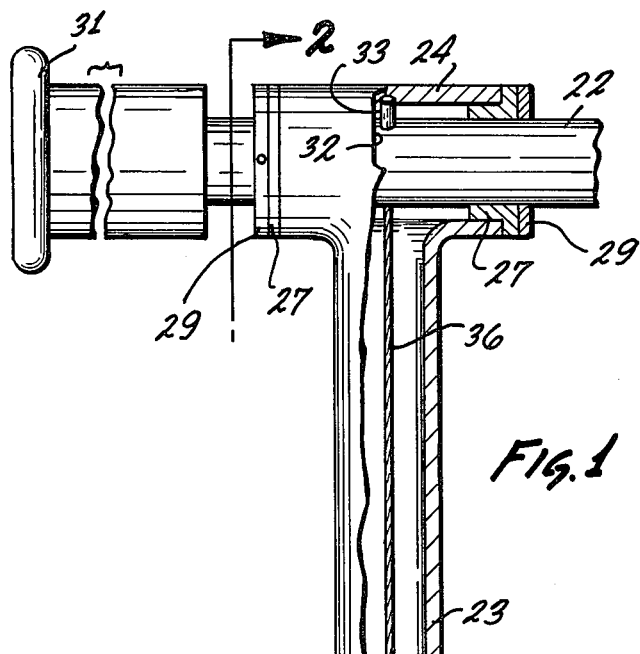
Fig.1
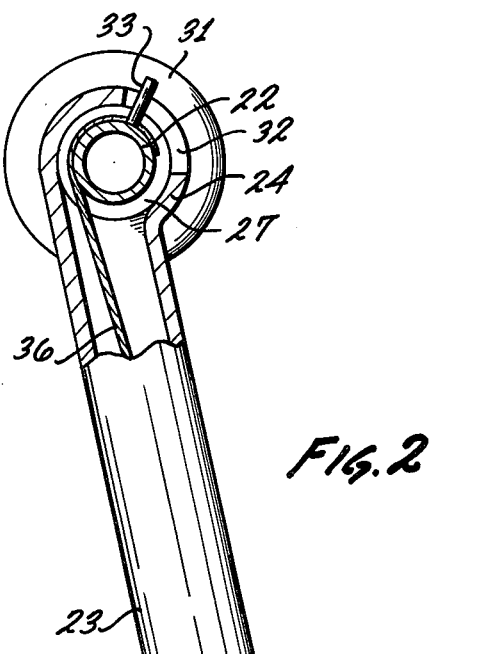
Fig.2
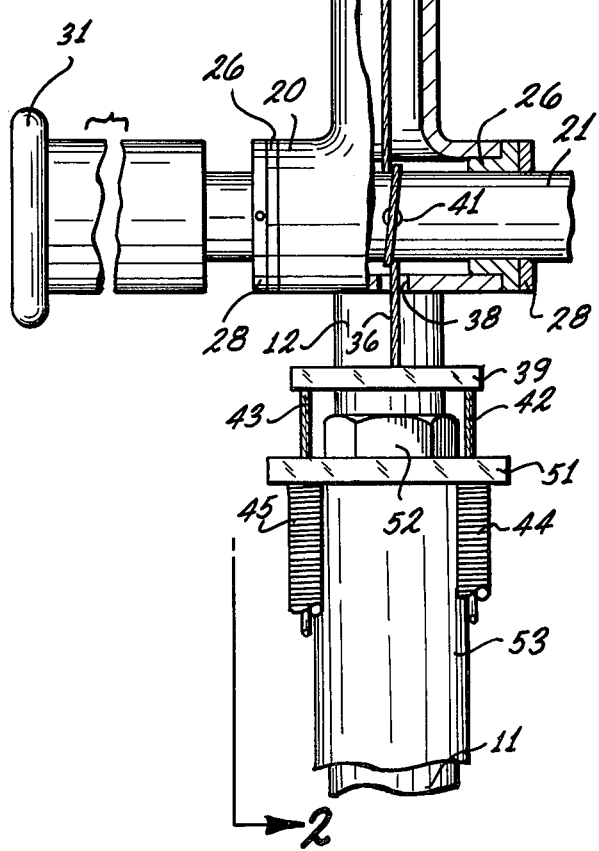
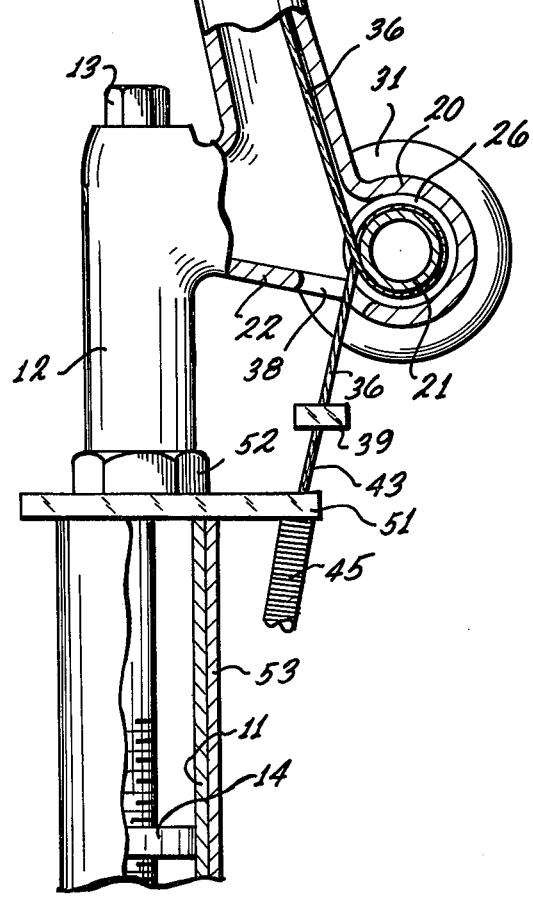

DUAL BRAKE ACTUATING HANDLE BARS AND BICYCLE NECK ASSEMBLY

FIELD OF THE INVENTION

This invention relates to bicycles and, more particularly, to the handle-bars and brake applications thereto.

BACKGROUND OF THE INVENTION

Prior art handle-bars for bicycles are either of the drop handle-bar type, or the raised handle-bar type. Drop handle types are primarily used on racing bicycles and 10-speed bicycles where speed is a factor. These drop handles consist of a substantially horizontal straight rod section attached to the gooseneck and two substantially U-shaped bent rod sections which extend forwardly and downwardly from both ends of the straight rod section. When running at high speeds, a rider will ordinarily grasp the U-shaped bent rod sections and, in so doing, will lean forward so as to minimize the wind resistance. This is all well and good to obtain increased speed but the rider's degree of awareness is minimal, as his head is down. This position is extremely unsafe. In traffic where his awareness must be great to prevent accidents, the rider will want to have his head raised. Therefore, he grasps the handle-bar at the straight rod section. Although his head is higher than before, it is still not as high as it could be, as his back is still bent, which is good, to reduce wind resistance. Therefore, bicycles that are to be used in traffic should have, preferably, the raised handle-bar type.

The raised handle-bar type also has a substantially horizontal straight rod section attached at mid-point to the gooseneck, and has, at each end thereof, upward bent rod sections. The rider, by grasping these upward bent sections can sit straight, with his head high. Then when he wants to obtain more speed and reduced wind resistance, he would grasp the horizontal straight rod section. On a bicycle with foot operated coaster brakes, this arrangement is good; but on a bicycle with caliper brakes, as used on multispeed bikes, this arrangement is dangerous because the hand brake handles are placed on the end of the handle-bars. Any auxilliary hand brake handles which could operate when the hands are on the straight section would be complicated mechanisms.

OBJECTS OF THE INVENTION

An object of this invention is to provide a handle-bar neck which allows one to place two handle-bars thereon, one over the other.

Anothe object of this invention is to provide an pair of rotating handle-bars so that a cable attached to both can actuate caliper brakes on a bicycle by simply rotating any one of the handle-bars.

Another object of this invention is to provide for a bicycle two straight section handle-bars disposed one over the other.

These and other objects and features of advantage will become more apparent after studying the following description of the preferred embodiment of my invention, together with the appended drawing.

BRIEF DESCRIPTION OF THE DRAWING

FIG. 1 is a front elevation of my novel handle-bar assembly, as would be mounted on a standard, for example, 10-speed bicycle.

FIG. 2 is a sectional view taken on line 2—2 and in the direction of the arrows of FIG. 1 showing my novel assembly in partial section.

DETAILED DESCRIPTION OF THE DRAWING

Referring to the drawing, my novel handle-bar assembly is shown with sufficient detail of a standard bicycle so that one can understand the principles and application of my invention. The parts of a standard bicycle are the sleeve of a fork 11 into which protrudes a stem 12 of my novel gooseneck. Stem 12 of my novel gooseneck is similar to the stem of standard goosenecks, in that stem 12 is somewhat tubular and has a long bolt 13 extending therethrough to engage a conical nut 14 at the lower end of stem 12. At the lower end, the stem has a pair of slits, not shown, so that as the bolt 13 is tightened, the nut 14 causes the sidewalls of the stem to bear against the sleeve of the fork, locking the two together in a standard manner. My novel gooseneck also includes a lower sleeve 20 extending forward of the stem 12, through which a lower handle-bar 21 is rotatably mounted. The sleeve 20 and stem 12 are connected by tubular section 22. Extending upward from section 22 is a tubular form 23 where, at the upper end, is formed an upper sleeve 24. Through sleeve 24, an upper handle-bar 22 is rotatably mounted. Rotation ability is provided by a pair of bearings 26 between the lower handle-bar 21 and sleeve 20 and a pair of bearings 27 between the upper handle-bar 22 and sleeve 24. A pair of suitable collars 28 are fixed to bar 21 to prevent axial movement, and a pair of suitable collars 29 are fixed to bar 22 also to prevent axial movement between the bar and the respective sleeves. On both ends of the bars 21 and 22, respectively, are placed suitable rubber grips 31.

In the upper sleeve 24 an opening 32 is formed which extends circumferentially, for example, 90° around the sleeve. A pin 33, which is fixed to bar 22, extends radially to dispose through said opening 32. This allows one to rotate the upper bar through an angle of no more than 90°. To pin 33 is anchored a flexible cable or wire 36 which extends around to the rear of bar 22, as shown, and down through form 23 and is preferably wrapped around bar 21 at least one turn in the direction as shown. Then the cable 31 drops out through an opening 38 in section 22 under sleeve 20 to a bar 39 attached to the end thereof as shown in FIG. 1.

The cable 36 is suitably fixed to bar 21 by a pin 41 to ensure that the cable is actuated when bar 21 is rotated. On opposite sides of cable 36, to the bar 39, the standard actuating brake wires 42 and 43 are fixed. These wires 42 and 43 extend down through standard spiral shields 44 and 45, respectively, to actuate the front and rear wheel brake calipers. As in a prior art bicycle, the shields 44 and 45 shown have their ends anchored to a plate 51. The plate 51 has a suitable hole which allows it to be threaded onto the sleeve of fork 11 and held in place by the nut 52 which holds the fork 11 to the bicycle frame 53.

In operation, the bike rider can either grasp the upper or lower pair of grips 31. If he wants to move fast in traffic, he grasps the lower pair to cut wind resistance, and if he wants to have full awarness, he grasps the upper pair. Assuming he has his hands on the upper pair and he desires to apply the brakes, he rotates the bar 22 clockwise, as viewed in FIG. 2. This places the cable in tension to lift up on bar 39 which, in turn, pulls on brake wires 42 and 43. The bar 39, cable 36 and wires 42 and 43 act like a whiffletree to proportionally divide the braking force between the front and rear wheels for safe and steady braking effort. This procedure prevents the locking of the front wheel brakes which can throw the rider. One can see that if the hands are on the lower grips, the brakes are also applied with a clockwise rotation now to bar 21. One can understand that the whiffletree allows both brakes to be applied simultaneously with proportional braking force for safety.

Having described the preferred embodiment of my invention one skilled in the art, after studying the above disclosure, could devise other embodiments coming within the scope and spirit of my invention. Therefore, my invention is not to be considered as limited to the disclosed embodiment, but includes all embodiments coming within the scope of the appended claims.

I claim:

1. A dual handle-bar and bicycle neck assembly for a bicycle having a sleeve on a fork rotatably mounted within the tube of a frame, said assembly comprising:
   a stem internally engaging said sleeve;
   a pair of spools, each mounted to said stem, one above the other;
   a handle-bar rotatably mounted within each spool;
   a cable attached to both handle-bars;
   a whiffletree attached to said cable and disposed below said spools; and
   a pair of brake wires attached to said whiffletree.

2. The assembly of claim 1 wherein:
   said stem has a gooseneck section extending away from said stem;
   one of said spools is mounted on the end of said gooseneck section.

3. The assembly of claim 2 wherein;
   said section is disposed at the top end of said stem;
   a tubular form is fixed to said section and extends away from said stem;
   said other spool is mounted at the upper end of said form.

4. The assembly of claim 3 wherein:
   said form is disposed at an angle to said stern so that said other spool is aligned with said stem.

5. The assembly of claim 4 wherein:
   said section has an opening formed on its under side opposite said form;
   said cable has one end fixed to said handle-bar disposed in said other spool;
   said cable is wound around said other handle-bar and extends through said opening to engage said whippletree.

6. The assembly of claim 5 wherein:
   said whippletree has said pair of brake wires attached thereto on opposite sides of said cable.

* * * * *